Figure 1:
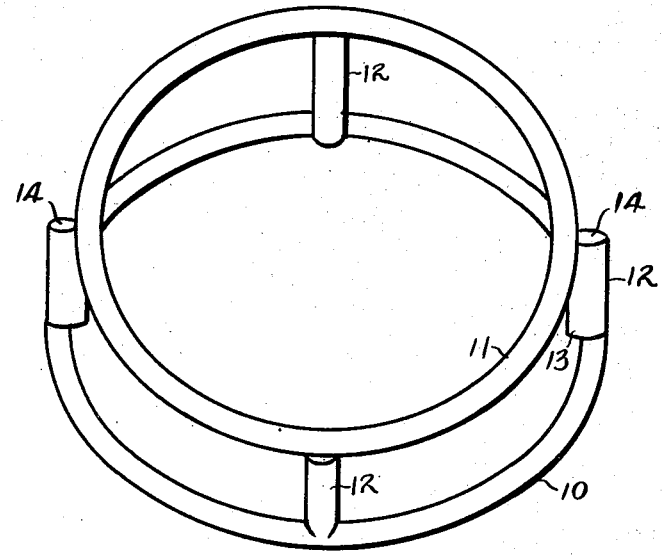
Figure 2:
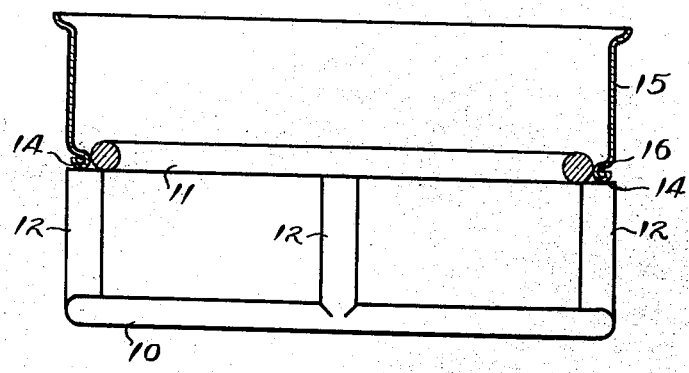

Oct. 22, 1940.  E. ST. JOHN  2,219,238
RIM STAND
Filed Nov. 28, 1939

Inventor
EVERETT ST. JOHN.
By Nelson Moore,
Attorney

Patented Oct. 22, 1940

2,219,238

UNITED STATES PATENT OFFICE 2,219,238

RIM STAND

Everett St. John, Bellaire, Ohio

Application November 28, 1939, Serial No. 306,586

1 Claim. (Cl. 157—6)

The present invention concerns tire changing or rim stands. It has for its purpose the provision of an inexpensive sturdy device capable of supporting the heavy single or double rims of truck tires and the like so that the tires may be driven off the rim.

It is an object of the invention to provide a device which has no moving parts and so will not get out of order.

It is an object of the invention to provide a device the very simplicity of construction of which makes it easy to use and build.

It is an object of the invention to provide a device which is sturdy in construction and yet sufficiently light in weight so that it may be easily moved from place to place.

It is an object of the invention to design a rim removing stand which lends itself to mass production either by casting in a single piece or building up by use of welding or an equivalent operation.

One embodiment of the invention is set forth in the drawing wherein like figures refer to like parts throughout.

Fig. I is a perspective view of the entire device.

Fig. II is an elevation of the device partially in section with a rim in place thereon.

A base 10 is shown as being formed of a piece of pipe bent into a circle and welded. It is readily understood that angle iron can be used for the same purpose if the projecting portion be bent or positioned, so as to aid in centering and retaining a rim in position on the stand.

Upper ring 11 of smaller diameter is provided and formed in the same manner as ring 10 and capable of the same variation in the construction. Uprights 12 are welded to ring 10 and ring 11. In the drawing they are four in number, however, the device could function readily with three such uprights or the number may be increased as is desired. It will be noted that the uprights or supporting members 12 are thicker than either of the rings 10, 11 as shown at 13. This thickness permits them to join the two rings which are of different diameters. Of course the uprights 12 may be tilted somewhat if desired and need not be vertical.

The upper portions of uprights 12 extend outwardly beyond ring 11 as at 14. This provides a bearing surface for a rim 15. It will be seen that beaded portion 16 rests thereon.

Upper ring 11 performs the double function of joining the uprights 12 which strengthen the structure and of centering the rim 15 on the stand.

In use the rim with the tire to be removed mounted thereon is placed on the stand in the position shown in Fig. II. The tire can then be forced downward over the stand and off of it. In this operation the ordinary hand tools may be used or pressure means employed to slide the tire off the rim.

The variation in size of rims may not be so great that the outer edges of surfaces 14 interfere with the removal of the tire. These edges may be relieved in any event.

As stated above it is an object of the invention to provide a device for both mounting and demounting tires. The use of the stand for such mounting is believed clear.

A feature of the device is its stability and low factor of overturn. Being low it is easy to use and greatly facilitates mounting and demounting vehicle tires of all kinds, but particularly the big heavy duty truck tires.

I claim:

In a portable tire changing stand, a base member, short uprights mounted on said base member, an annular frame member having an outwardly and downwardly curved peripheral surface and attached to the upper portions of said uprights, said peripheral surface of said frame member centering and retaining a standard rim on said uprights, said uprights extending radically beyond said annular frame member for presenting a supporting surface for said rim, all of said uprights lying within the inner periphery of a tire mounted on said standard rim whereby said tire may be forced off of said rim and loosely received around said uprights.

EVERETT ST. JOHN.